(12) United States Patent
Nakamoto

(10) Patent No.: US 8,856,318 B2
(45) Date of Patent: Oct. 7, 2014

(54) NETWORK SYSTEM, DATA PROCESSING METHOD, AND COMPUTER READABLE STORAGE MEDIUM ON WHICH IS STORED A COMPUTER PROGRAM

(75) Inventor: Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 12/990,885

(22) PCT Filed: Jul. 6, 2010

(86) PCT No.: PCT/JP2010/004422
§ 371 (c)(1),
(2), (4) Date: Nov. 3, 2010

(87) PCT Pub. No.: WO2011/004592
PCT Pub. Date: Jan. 13, 2011

(65) Prior Publication Data
US 2011/0167144 A1 Jul. 7, 2011

(30) Foreign Application Priority Data
Jul. 9, 2009 (JP) ................................. 2009-163105

(51) Int. Cl.
*G06F 9/44* (2006.01)
*G06F 15/173* (2006.01)
*H04N 1/00* (2006.01)
*G03G 15/00* (2006.01)
*G06F 9/445* (2006.01)

(52) U.S. Cl.
CPC . *H04N 1/00145* (2013.01); *G03G 2215/00109* (2013.01); *H04N 1/00244* (2013.01); *H04N 1/00344* (2013.01); *G03G 2215/00113* (2013.01); *G03G 15/5075* (2013.01); *H04N 1/00413* (2013.01); *G06F 8/61* (2013.01); *H04N 1/00233* (2013.01)
USPC ............................ 709/224; 717/171; 717/173

(58) Field of Classification Search
USPC ................................... 718/169–171; 709/224
See application file for complete search history.

(56) References Cited

U.S. PATENT DOCUMENTS

2006/0126111 A1* 6/2006 Song et al. .................... 358/1.15
2006/0221684 A1* 10/2006 Iwai .......................... 365/185.03
2008/0228855 A1* 9/2008 Park .............................. 709/201

FOREIGN PATENT DOCUMENTS

| EP | 0703531 A1 * | 8/1995 | ............... G06F 9/44 |
| JP | 2002-342204 A | 11/2002 | |
| JP | 2003-005991 A | 1/2003 | |
| JP | 2009-146119 A | 7/2009 | |

* cited by examiner

*Primary Examiner* — Larry Donaghue
(74) *Attorney, Agent, or Firm* — Canon USA, Inc. IP Division

(57) ABSTRACT

A delivery server association button of a Web screen 1103 for a monitoring center host computer is depressed to start a Web browser, opening a Web screen for a delivery server. A request from the Web screen for the delivery server and a retrieval request including retrieval conditions are transmitted to the monitoring center host computer. The monitoring center host computer retrieves an image forming apparatus according to the retrieval conditions and transmits the results of retrieval along with information for detecting the interpolation thereof from the monitoring center host computer to the delivery server via a PC with the delivery server as a redirection destination.

12 Claims, 17 Drawing Sheets

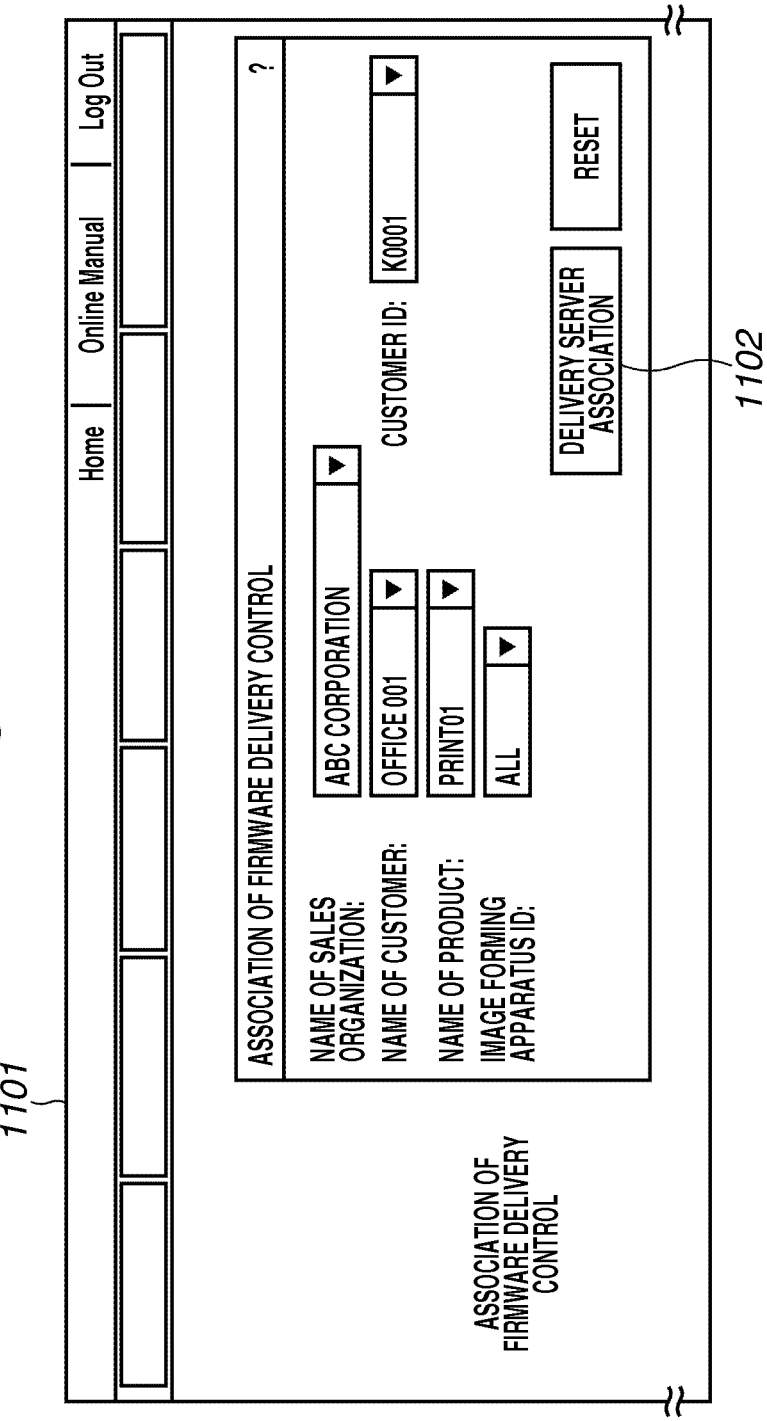

SETTING OF FIRMWARE DELIVERY CONTROL
SELECTION OF DEVICE

INPUT RETRIEVAL CONDITIONS AND CLICK RETRIEVAL BUTTON.

| DELIVERY STATUS | ☑ STILL TO BE SET | ☑ WAITING FOR COMMUNICATION | ☑ NEW | ☑ WAITING FOR DELIVERY | ☑ IN COURSE OF DELIVERY | ☑ COMPLETION OF DELIVERY | ☑ BEING APPLIED | ☐ COMPLETION | ☐ FAILURE | ☐ CANCEL |
|---|---|---|---|---|---|---|---|---|---|---|
| PUBLICATION CLASSIFICATION | ⊙ EXCEPT INDIVIDUAL HANDLING | ○ INDIVIDUAL HANDLING | | | | | | | | |

[🔍 RETRIEVAL] [RESET]

⬇ DOWNLOAD OF OPERATION MANUAL

RETRIEVAL RESULTS
SELECT FROM LIST.

| SELECTION | DEVICE ID | CURRENT VERSION | INDIVIDUAL HANDLING | APPLICATION VERSION | STATE | SCHEDULED DATE AND HOUR OF DELIVERY | APPLICATION METHOD | DELIVERY METHOD | DELIVERY STATUS |
|---|---|---|---|---|---|---|---|---|---|
| ☐ | ZZZ00088 | NOT CLEAR | | | | | | | STILL TO BE SET |
| ☐ | ZZZ00089 | | | | EXEMPTION | | | | STILL TO BE SET |
| ☐ | ZZZ00090 | 1.001 | * | 1.003 | | 2008/05/04 22:30 | MANUAL | DIFFERENTIAL DELIVERY | WAITING FOR COMMUNICATION |
| ☐ | ZZZ00091 | 1.001 | * | 1.003 | | 2008/05/04 23:01 | MANUAL | DIFFERENTIAL DELIVERY | NEW |
| ☐ | ZZZ00092 | 1.001 | * | 1.003 | | 2008/05/04 23:11 | AUTOMATIC | DIFFERENTIAL DELIVERY | WAITING FOR DELIVERY |
| ☐ | ZZZ00093 | 1.001 | | 1.003 | | 2008/05/04 23:21 | AUTOMATIC | COLLECTIVE DELIVERY | IN COURSE OF DELIVERY |
| ☐ | ZZZ00094 | 1.000 | | 1.003 | | 2008/05/10 21:35 | MANUAL | COLLECTIVE DELIVERY | COMPLETION OF DELIVERY |
| ☐ | ZZZ00095 | 1.000 | | 1.003 | | 2008/05/10 21:45 | AUTOMATIC | COLLECTIVE DELIVERY | COMPLETION OF DELIVERY |
| ☐ | ZZZ00096 | 1.000 | | 1.003 | | 2008/04/30 21:55 | AUTOMATIC | COLLECTIVE DELIVERY | BEING APPLIED |
| ☐ | ZZZ00097 | 1.003 | | 1.003 | LATEST | 2008/05/03 18:00 | AUTOMATIC | COLLECTIVE DELIVERY | COMPLETION |
| ☐ | ZZZ00098 | 1.000 | | 1.003 | | 2008/05/03 23:04 | AUTOMATIC | COLLECTIVE DELIVERY | CANCEL |
| ☐ | ZZZ00099 | 1.000 | | 1.003 | | 2008/05/02 18:00 | AUTOMATIC | COLLECTIVE DELIVERY | FAILURE(00001) |

[NEXT ➡] [END]

FIG.9

| PARAMETER | CONTENT |
|---|---|
| FIXED CHARACTER STRING A (5 DIGITS) | FIXED CHARACTER STRING (EXAMPLE) "AAAAA" |
| THE NUMBER OF RETRIEVED IMAGE FORMING APPARATUSES | THE NUMBER OF IMAGE FORMING APPARATUSES SENT BACK TO WEB SCREEN FOR DELIVERY SERVER AS A RETRIEVE RESULT BY MONITORING CENTER HOST COMPUTER |
| SERVER TIME STAMP | YYYYMMDDHHMM |

| NAME OF ITEM | TYPE | THE NUMBER OF DIGITS | REMARKS |
|---|---|---|---|
| REGION | NUMERIC VALUE | 2 | 1: EUROPE 2: AUSTRALIA 3: USA 4: JAPAN 5: SINGAPORE 6: KOREA |
| PRODUCT CODE | CHARACTER | 8 | PRODUCT CODE |
| LANGUAGE | CHARACTER | 2 | UK (English-UK), JA (Japanese), IT (Italian), FR (French), ES (Spanish), EN (English-US), DE (German) |
| THE NUMBER OF IMAGE FORMING APPARATUSES | NUMERIC VALUE | 7 | 100 |
| FORMING APPARATUS ID | CHARACTER | 12 | AAAAA |

FIG.11

| ASSEMBLED SERVER KEYS | CALCULATED HASH VALUES |
|---|---|
| AAAAA20810230859100 | XXXXXXXXXXXXXX |
| AAAAA20810230858100 | ZZZZZZZZZZZ |
| AAAAA20810230857100 | XXXXZZZZZZ |
| AAAAA20810230856100 | XXXXYYYYZZ |
| AAAAA20810230900100 | XXXXYYYYYY |

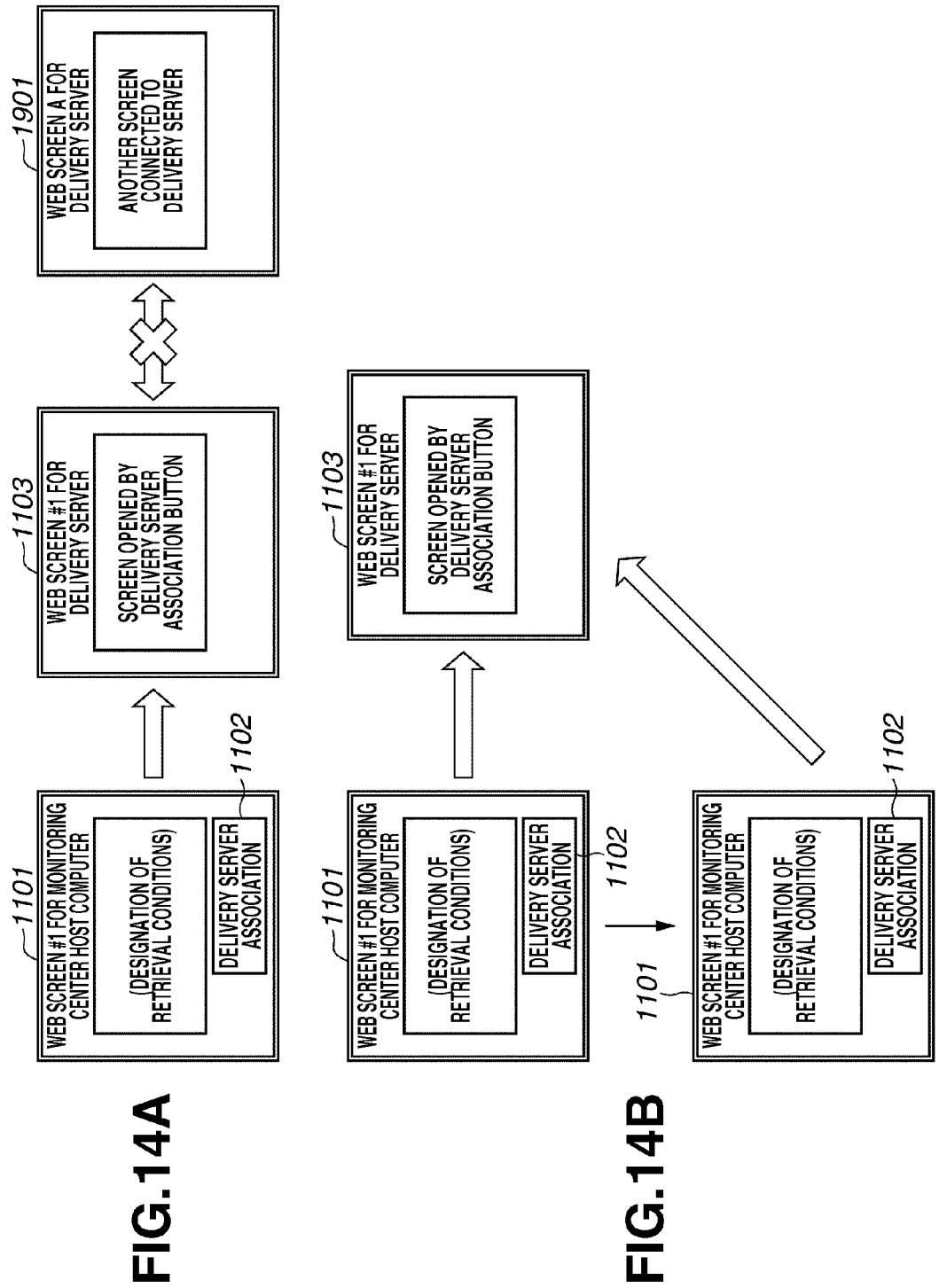

NETWORK SYSTEM, DATA PROCESSING METHOD, AND COMPUTER READABLE STORAGE MEDIUM ON WHICH IS STORED A COMPUTER PROGRAM

TECHNICAL FIELD

The present invention relates to a network system and data processing method, and, in particular, to those preferably usable to transmit and receive data between different systems.

BACKGROUND ART

One of functions of a delivery server delivering firmware or application of an image forming apparatus is to upgrade the firmware of the image forming apparatus from a remote position. Until now, upgrading the firmware from a remote position has been performed in the following manner. When the application of the image forming apparatus issues instructions for delivery to the delivery server, information about the firmware is transmitted to the delivery server and then the delivery server delivers a latest firmware to the image forming apparatus (refer to Japanese Patent Application No. 2003-5991).

In a technique discussed in Japanese Patent Application No. 2003-5991, however, a serviceman needs to visit a customer to perform an operation for accessing the delivery server from the image forming apparatus. This causes a problem in that the cost for updating the firmware is increased.

In order to update the firmware without the serviceman visiting the customer, a function is required in which a monitoring center host computer of the image forming apparatus collaborates with the delivery server to deliver the firmware to the image forming apparatus which monitors the monitoring center host computer. When this function is used, the image forming apparatus to which the firmware is delivered is retrieved on a Web screen of the monitoring center host computer and information about the image forming apparatus is transmitted as a retrieval result to the delivery server. If the programs in the delivery server and the monitoring center host computer are not separated, a following problem occurs. Even if a very small correction of these programs occurs, the programs for the entire system need to be tested, which increases time required for testing the programs and reduces availability of the system. For this reason, the programs in the delivery server and the monitoring center host computer are separated in most cases.

However, since the monitoring center host computer and the delivery server are separate systems, a user's burden of operation may increase in acquiring retrieval results from the monitoring center host computer and providing it to the delivery server. Furthermore, data needs to be transmitted through a network in which security is uncertain, so that security probably cannot be ensured for the transmission of data through the network.

CITATION LIST

Patent Literature

[PTL 1]
Japanese Patent Application Laid-Open No. 2003-5991

SUMMARY OF INVENTION

The present invention is directed to reduce user's burden in transmitting and receiving data between a system for monitoring a device and a system for delivering data to the device.

The present invention is further directed to enable transmission and reception of the data between the system for monitoring the device and the system for delivering data to the device at a high security level.

To solve at least a part of the above objects of the invention, in a network system of the present invention, a device management system configured to communicate with a plurality of devices to manage collected device information indicating the setting and configuration of the devices, a data delivery system configured to deliver data to the devices and an information processing apparatus with a display device are connected with each other.

According to an aspect of the present invention, the information processing apparatus includes a first display unit configured to display a first screen provided by the device management system on the display device; a second display unit configured to display a second screen provided by the data delivery system on the display device when a user performs a predetermined operation on the first screen provided by the device management system; and a request unit configured to request the device management system to retrieve a device to which data is to be delivered via the second screen provided by the data delivery system; the device management system includes a retrieval unit configured to retrieve a device based on the request from the request unit; and a responding unit configured to transmit information related to the results of retrieval by the retrieval unit to the information processing apparatus as the response to the request from the request unit with the data delivery system as a redirection destination; and the data delivery system includes a receiving unit configured to receive the information related to the results of retrieval from the information processing apparatus according to the redirection operated on the information processing apparatus.

Further features of the present invention will become apparent from the following description of exemplary embodiments with reference to the attached drawings.

BRIEF DESCRIPTION OF DRAWINGS

The accompanying drawings, which are incorporated in and constitute apart of the specification, illustrate embodiments of the invention and, together with the description, serve to explain the principles of the invention.

FIG. 1 is a schematic diagram illustrating the configuration of an entire monitoring system.
FIG. 2 is a block diagram illustrating the configuration of hardware of the monitoring center host computer.
FIG. 3 is a block diagram illustrating the configuration of hardware of an image forming apparatus.
FIG. 4A is a block diagram illustrating the configuration of software of each apparatus of the monitoring system.
FIG. 4B is a block diagram illustrating the configuration of software of each apparatus of the monitoring system.
FIG. 4C is a block diagram illustrating the configuration of software of each apparatus of the monitoring system.
FIG. 5 is a block diagram illustrating the configuration of function of the monitoring center host computer and a delivery server.

FIG. 6 illustrates the processing of each apparatus for responding to a request for retrieving the image forming apparatus from a PC.

[FIG. 7A]

FIG. 7A illustrates the Web screens for the monitoring center host computer and the delivery server.

[FIG. 7B]

FIGS. 7B illustrates the Web screens for the monitoring center host computer and the delivery server.

FIG. 8A schematically illustrates the contents of communication data.

FIG. 8B schematically illustrates the contents of communication data.

[FIG. 9]

FIG. 9 schematically illustrates the contents of a server key.

[FIG. 10]

FIG. 10 illustrates the contents of associating data.

[FIG. 11]

FIG. 11 illustrates server keys and hash values thereof.

FIG. 12 is a flow chart describing an example of processing of the monitoring center host computer.

FIG. 13 is a flow chart describing an example of processing of the delivery server.

[FIG. 14A]

FIG. 14A illustrates shift of the Web screens of the monitoring center host computer and the delivery server.

[FIG. 14B]

FIG. 14B illustrates shift of the Web screens of the monitoring center host computer and the delivery server.

FIG. 14C illustrates shift of the Web screens of the monitoring center host computer and the delivery server.

DESCRIPTION OF EMBODIMENTS

Various exemplary embodiments, features, and aspects of the invention will be described in detail below with reference to the drawings.

Figure 1:
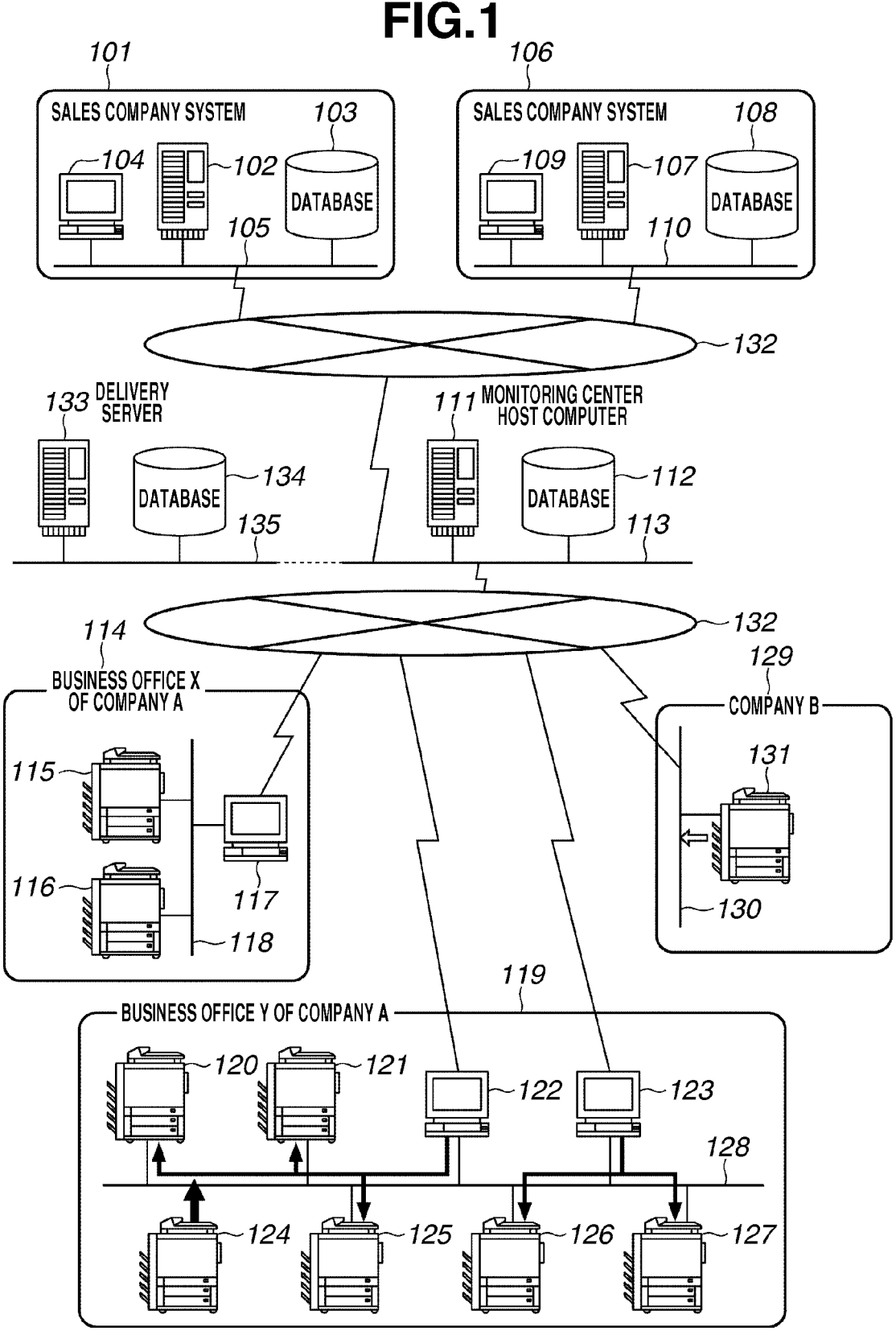
[FIG. 1]

FIG. 1 is a schematic diagram illustrating an example of the configuration of an entire monitoring system. In FIG. 1, the monitoring system is an example of a network system and includes a plurality of sales company systems 101 and 106. The sales company systems 101 and 106 include databases 103 and 108 for storing sales information about territory and customers and information about the monitoring system respectively. The sales company systems 101 and 106 further include PCs 104 and 109 for controlling the registration of data into the databases 103 and 108 and the correction of data respectively. The PCs 104 and 109 access a Web site provided by a monitoring center host computer 111 to browse data. Sales company host computers 102 and 107 play a role in handling business of sales companies such as charging processing and serviceman-sending processing using data in the monitoring center host computer 111. The sales company host computers 102 and 107 can also play a role of the PCs 104 and 109 respectively when they include an operation unit and a display unit.

The sales company host computer 102, the database 103, and the PC 104 are connected to one another via a LAN 105. The sales company host computer 107, the database 108, and the PC 109 are connected to one another via a LAN 110. As illustrated in FIG. 1, each system in the sales company is formed of a plurality of apparatuses to achieve the each function described later. For example, the databases 103 and 108 may physically exist in the sales company host computers 102 and 107 respectively. Alternatively, the databases 103 and 108 may exist in a different location which can be accessed by the sales company host computers 102 and 107 via the Internet 132. In other words, the sales company host computers 102 and 107 may be formed of a plurality of apparatuses or a single apparatus.

The monitoring center host computer 111 as an example of a device management apparatus exists between the sales company and a customer. A database 112 stores information for monitoring the image forming apparatus, counter information about the image forming apparatus collected from customers, information about failure history, and failure pattern table. The monitoring center host computer 111 is connected to the database 112 via a LAN 113. The LAN 113 is connectable to the Internet 132. The database 112 may physically exist in the monitoring center host computer 111. Alternatively, the database 112 may exist in a different location which can be accessed by the monitoring center host computer 111 via the Internet 132.

The monitoring center host computer 111 has a function to collect information about the image forming apparatus to be monitored and information about the operating conditions of the image forming apparatus (including failure information) from monitoring apparatuses 117, 122, and 123 of a company A or an image forming apparatus 131 of a company B, store and process the information, and issue a warning to the outside. For example, the monitoring center host computer 111 has a function to deliver those pieces of information.

The operating conditions of the image forming apparatus include, for example, shortage of toner, opening of a door, replacement of a drum, absence of a cartridge, malfunction of a cooling fan, a defective substrate, dirt on a document positioning glass plate, shortage of staplers, and deficiency in a light amount of a sheet feeding sensor. The operating conditions of the image forming apparatus also include overflow of a font memory, rendering error, malfunction of a fixing unit, malfunction of a counter, malfunction of a two-sided conveyance unit, and jam of paper.

Counter information is also included in the operating conditions of the image forming apparatus. The counter information includes a charging counter indicating charge in a sales company, a department counter counted by each department of a customer, a size counter counted by paper size, and a component counter indicating wear-out rate of a component in the image forming apparatus. The charging counter indicates the number of sheets to be printed in the image forming apparatus and the department counter indicates the number of sheets to be printed by each department set by a customer. The component counter counts the rotation number of a component such as a drum, or counts time (seconds) as to a component such as a scanner lamp.

The sales company host computers 102 and 107 can register information about the image forming apparatus to be monitored and setting about monitoring in the monitoring center host computer 111. The monitoring center host computer 111 merges information about the image forming apparatus to be monitored, and setting about monitoring to collectively manage them. The monitoring center host computer 111 can also make a setting about monitoring for the monitoring apparatuses 117, 122, and 123 and the image forming apparatus 131.

A service provided by the monitoring system illustrated in FIG. 1 is offered based on a contract between a sales company and a customer. For this reason, only the image forming apparatus which the sales company determines as a target to be monitored based on the contract is monitored by the monitoring system. The monitoring center host computer 111 provides the PCs (PC 104 and 109, for example) connected thereto via the Internet 132 with information stored in the database 112 or a Web page for browsing processed information. The Web page is provided in such a manner that contents of browse are restricted for each of sales company, customer, and authorization of a user based on user authentication. Data can be partially changed through the Web page.

A delivery server 133 as an example of a data delivery apparatus exists between the sales company and a customer. A database 134 stores a firmware and an application applied to the image forming apparatus and software license information. The delivery server 133 is connected to the database 134 via the LAN 135. The LAN 135 is connectable to the Internet 132. The database 134 may physically exist in the delivery server 133. Alternatively, the databases 134 may exist in a different location which can be accessed by the delivery server 133 via the Internet 132. The LAN 113 may be identical to the LAN 115 and the databases 134 and 112 may share data.

FIG. 1 illustrates only one monitoring center host computer 111, database 112, delivery server 133, and database 134. However, a plurality of monitoring center host computers and databases may perform distributed processing to collect information from a large number of image forming apparatuses and monitoring apparatuses and disperse the burden of distribution of firmware.

An example of configuration of a system on the customer side is described below. A plurality of different environments exists on the customer side. FIG. 1 illustrates customer systems 114, 119, and 129. The monitoring apparatus 117 monitors the image forming apparatuses 115 and 116 connected to a LAN 118 in the customer system 114 (business office X of company A) . The monitoring apparatus 117 communicates with the monitoring center host computer 111 via the LAN 118 and the Internet 132. On the other hand, the monitoring apparatuses 122 and 123 monitor the image forming apparatuses 120, 121, 124 to 127 connected to a LAN 128 in the customer system 119 (business office Y of company A). More specifically, the monitoring apparatus 122 manages the image forming apparatuses 120, 121, 124, and 125 and the monitoring apparatus 123 manages the image forming apparatuses 126 and 127.

The monitoring apparatuses 117, 122, and 123 are mutually connected to a database (not shown). The monitoring apparatuses 117, 122, and 123 store data collected from the image forming apparatuses monitored by themselves and results of processed stored-data. Setting related to the monitoring of the image forming apparatus is stored in the database (not shown). The database (not shown) is connected to the LANs 118 and 128 and may be independent. The database (not shown) may exist in a different location which can be accessed by the monitoring apparatuses 117, 122, and 123 via the Internet 132. Every time the monitoring apparatuses 117, 122, and 123 receive information indicating the operating conditions of the image forming apparatuses monitored by themselves from the image forming apparatuses, the monitoring apparatuses 117, 122, and 123 transmit the information to the monitoring center host computer 111.

In the customer system 129 (company B), the image forming apparatus 131 connected to the LAN 130 directly communicates with the monitoring center host computer 111 via the Internet 132. The image forming apparatus 131 has a function equivalent to that of the monitoring apparatuses 117, 122, and 123 and actively transmits information indicating operating conditions thereof to the monitoring center host computer 111.

The image forming apparatuses 115, 116, 120, 121, and 124 to 127 in the company A can communicate with the monitoring center host computer 111 via the monitoring apparatuses 117, 122, and 123. As is the case with the image forming apparatus 131 in the company B, the image forming apparatuses 115, 116, 120, 121, and 124 to 127 in the company A also may communicate with the monitoring center host computer 111 without passing through the monitoring apparatuses.

A HTTP/SOAP protocol can be used for communication via the Internet 132 in the configuration stated above. "SOAP" is an abbreviation of "simple object access protocol." The SOAP is a protocol by which a computer calls data or service of other computers, based on XML (extended markup language). The SOAP is implemented over the HTTP. In the communication using the SOAP, a SOAP message in which supplementary information is provided to a XML document is exchanged. For this reason, a computer in which the SOAP is stored includes a SOAP message generation unit which generates a SOAP message and a SOAP message interpretation unit which interprets a SOAP message. In the present exemplary embodiment, information in the image forming apparatus is transmitted to the monitoring center host computer 111 via the SOAP message.

Figure 2:
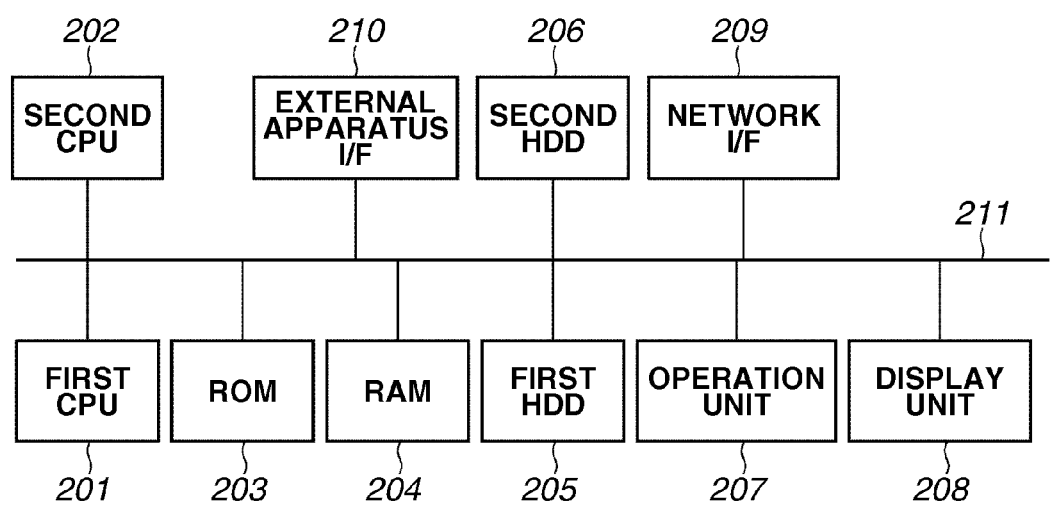
[FIG. 2]

FIG. 2 is a block diagram illustrating an example of the configuration of hardware of the monitoring center host computer 111. The hardware of the delivery server 133 and the sales company host computers 102 and 107 also can be realized by the configuration illustrated in FIG. 2. The hardware of the monitoring apparatuses 117, 122, and 123 and the PCs 104 and 109 also can be realized by the configuration illustrated in FIG. 2. The configuration of the hardware is not limited to that illustrated in FIG. 2. For example, a single CPU and HDD may be used in the hardware in FIG. 2.

In FIG. 2, a first and a second CPU 201 and 202 control the processing of the apparatus. An unrewritable ROM 203 stores programs (computer programs) and data related to the processing of the apparatus. A RAM 204 electrically and rewritably stores temporal data related to the processing of the apparatus. A first and a second HUD 205 and 206 store programs and data related to the processing of the apparatus and temporal data. Information about the image forming apparatus to be monitored and information collected from the image forming apparatus are stored in the first and the second HUD 205 and 206. For example, the component counter, the charging counter, and the department counter are stored in the first and the second HUD 205 and 206.

For the monitoring center host computer 111, a program executing processing described later is stored in the first HDD 205. The program uses the RAM 204 as a temporary storage area and is called and executed by the first CPU 201 or the second 202.

For the delivery server 133, similarly to the monitoring center host computer 111, a program executing processing described later is stored in the first HDD 205. The program uses the RAM 204 as a temporary storage area and is called and executed by the first CPU 201 or the second 202.

An operation unit 207 is an input apparatus, which includes a keyboard and a pointing device whereby instructions are input to the apparatus. A display unit 208 displays operating conditions of the image forming apparatus and information output by the programs operating on the apparatus. A network I/F 209 connects the monitoring center host computer 111 to the LAN and the Internet via a network to exchange information with the outside. An external apparatus I/F 210 connects the monitoring center host computer 111 to an external storage apparatus. The above elements are mutually connected to one another by a system bus 211 to transfer data.

Figure 3:
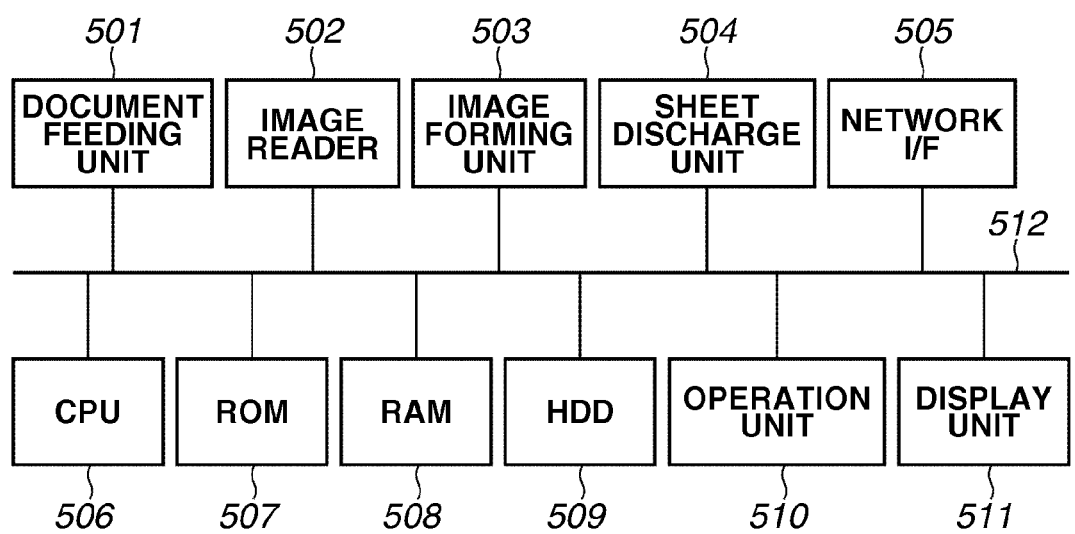
[FIG. 3]

FIG. 3 is a block diagram illustrating an example of the configuration of hardware of the image forming apparatuses 115, 116, 120, 121, 124, 125, 126, 127, and 131. An image forming apparatus is an example of a device, which includes a multifunction peripheral into which a printer and a facsimile function are integrally incorporated, a printer which receives and prints data from a PC and the like (including a printer using an electrophotographic method or an ink jet method), a scanner, and a facsimile apparatus. In FIG. 3, the configuration of a multifunction peripheral is illustrated as an example of the image forming apparatus.

An image reader 502 reads information of a document sent from a document feeding unit 501. An image forming unit 503 converts, prints and outputs information of the document read by the image reader 502 and data received via a network. A sheet discharge unit 504 discharges, sorts and staples a printed and output paper. A network I/F 505 connects the image forming apparatus to the LAN and the Internet via a network to exchange information with the outside. A CPU 506 controls the processing of the apparatus. The CPU 506 monitors the operating conditions of the image forming apparatus and conducts processing for transmitting information indicating the conditions to a predetermined destination if a specific event such as failure occurs. The destination is the monitoring center host computer 111 and the monitoring apparatuses 117, 122, and 123, for example.

A ROM 507 is a nonvolatile storage medium and stores programs and data related to the processing of the apparatus. A RAM 508 electrically and rewritably stores temporal data related to the processing of the apparatus. A HDD 509 stores programs and data related to the processing of the apparatus, temporal data, and transmitted user data. An operation unit 510 receives instructions to be input to the apparatus . A display unit 511 displays operating conditions of the apparatus and information about the operation of the operation unit 510. The above elements are mutually connected to one another by a system bus 512 to transfer data.

In the image forming apparatus 131 that has a function to actively transmit information for monitoring, the ROM 507 or the HDD 509 stores programs and data related to processing for transmitting data for monitoring the apparatus.

Figure 4A:
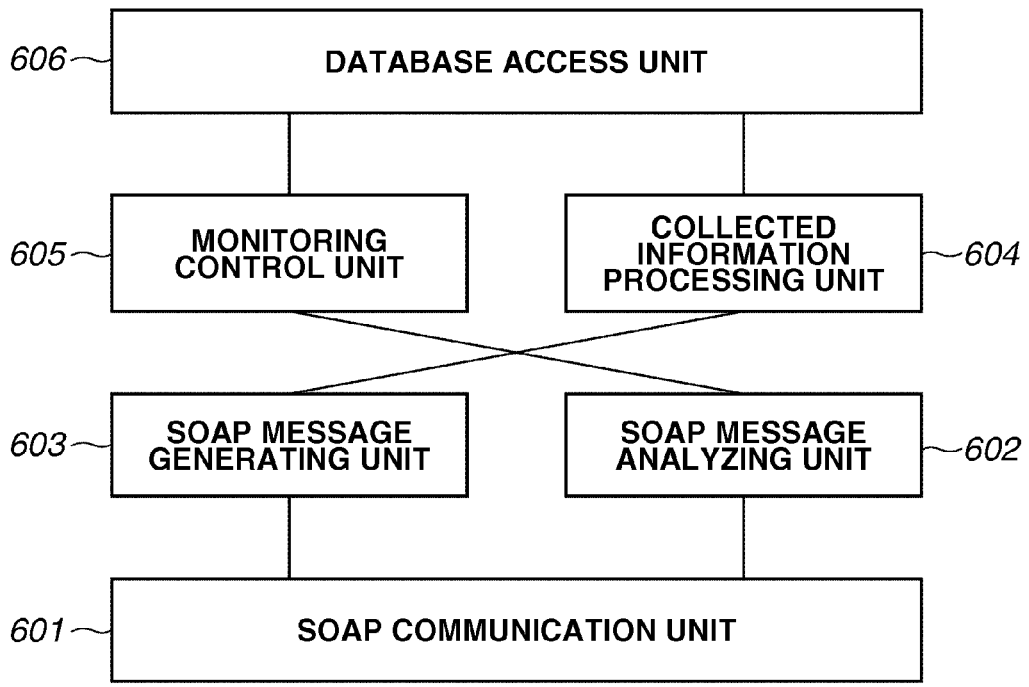
[FIG. 4A]

FIG. 4 is a block diagram illustrating an example of configuration of software of each apparatus in the monitoring system. More specifically, FIG. 4A is a block diagram illustrating an example of configuration of software for a part related to the monitoring system for the image forming apparatus in the monitoring center host computer 111 and the delivery server 133.

A SOAP communication unit 601 delivers SOAP data received from the monitoring apparatuses 117, 122, and 123 or the image forming apparatus 131 via the network I/F 209 to a SOAP message analyzing unit 602. The SOAP communication unit 601 transmits SOAP data created by a SOAP message creating unit 603 to the monitoring apparatuses 117, 122, and 123 or the image forming apparatus 131 via the network I/F 209.

An information collection unit 604 stores information received from the monitoring apparatuses 117, 122, and 123 or the image forming apparatus 131 in the databases 112 and 134 via a database access unit 606 as it is or by processing it. The information collection unit 604 also realizes a function related to a remote monitoring system. For example, the information collection unit 604 notifies a serviceman in charge and a manager on the customer side of counter information, error information, and latest information about the firm based on information received from the monitoring apparatuses 117, 122, and 123 which are monitoring the image forming apparatuses or the image forming apparatus 131 and data stored in the databases 112 and 134.

A monitoring control unit 605 manages a schedule for acquiring information about the monitoring apparatuses 117, 122, and 123 or the image forming apparatus 131 and controls monitoring contents and method. The monitoring control unit 605 issues instructions to the monitoring apparatuses 117, 122, and 123 or the image forming apparatus 131 via the SOAP message creating unit 603, the SOAP communication unit 601, and network I/F 209 if required.

Figure 4B:
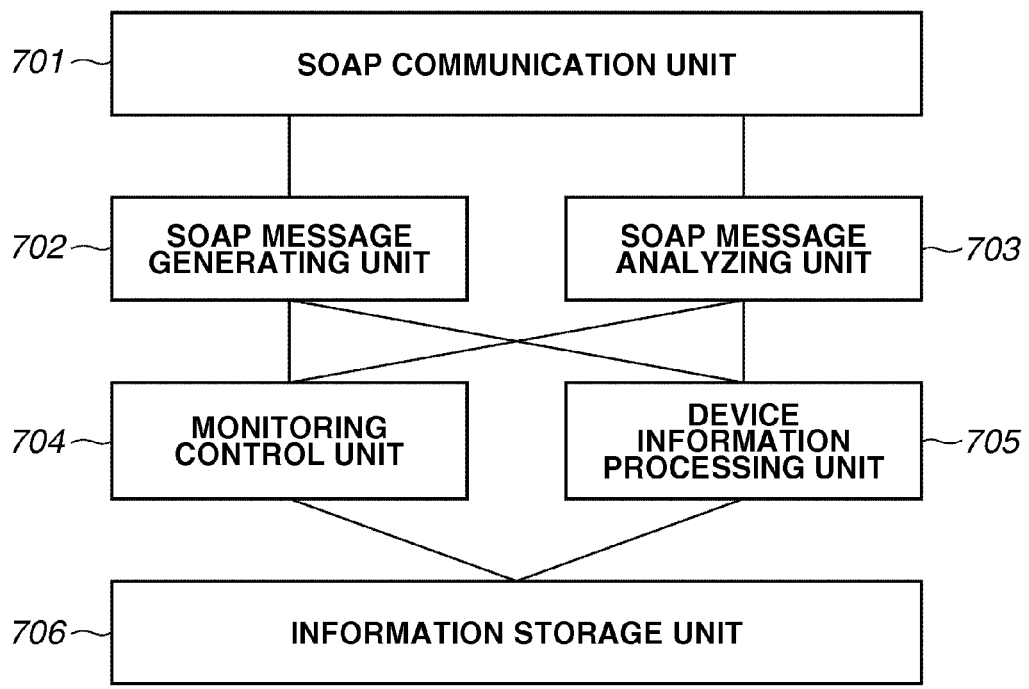
[FIG. 4B]

FIG. 4B is a block diagram illustrating an example of configuration of software for a part related to the monitoring system for the image forming apparatus in the monitoring apparatuses 117, 122, and 123.

A SOAP communication unit 701 delivers SOAP data received from the monitoring center host computer 111 via the network I/F 209 to a SOAP message analyzing unit 703. The SOAP communication unit 701 transmits SOAP data created by a SOAP message creating unit 702 to the monitoring center host computer 111 and the delivery server 133 via the network I/F 209.

A monitoring control unit 704 manages a schedule such that information about operation of the image forming apparatuses stored in an information storage unit 706 is updated according to the monitoring setting of the monitoring center host computer 111, or information about operation of the image forming apparatuses 115 and 116 is acquired.

A device information processing unit 705 stores information about operation such as counter information, service calls, jam, shortage of toner, and the like actively collected from the image forming apparatuses according to the schedule managed by the monitoring control unit 704 in an information storage unit 706. The device information processing unit 705 may store such information depending on conditions of the image forming apparatuses 115 and 116.

Data stored in the information storage unit 706 is delivered to the SOAP message creating unit 702 via the device information processing unit 705 as it is and transmitted to the monitoring center host computer 111. However, the data stored in the information storage unit 706 can also be delivered to the SOAP message creating unit 702 after being interpreted and processed in the device information processing unit 705 and then transmitted to the monitoring center host computer 111.

Figure 4C:
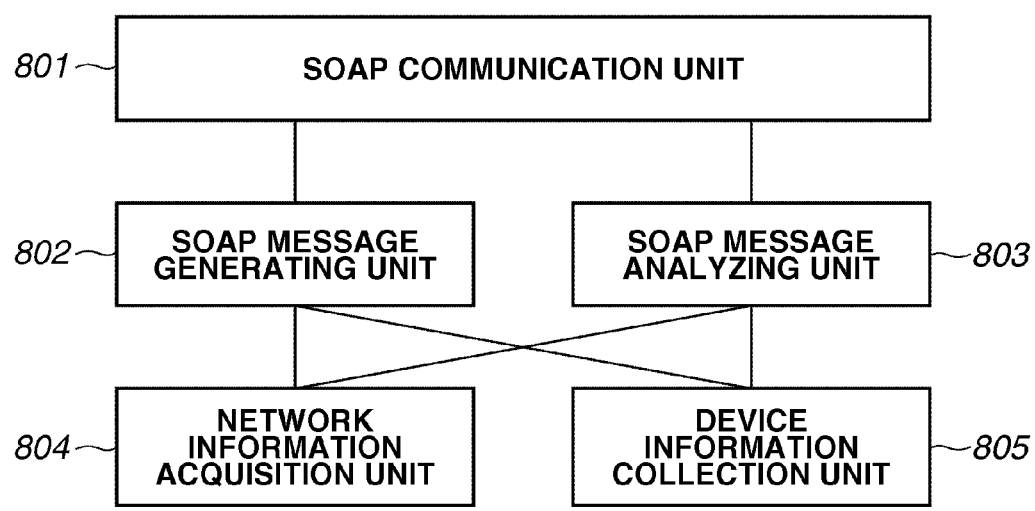
[FIG. 4C]

FIG. 4C is a block diagram illustrating an example of configuration of software for a part related to the monitoring system for the image forming apparatus in the image forming apparatuses 115, 116, 120, 121, 124 to 127, and 131.

A SOAP communication unit 801 delivers SOAP data received from the monitoring center host computer 111 and the delivery server 133 via the network I/F 505, to a SOAP message analyzing unit 803. The SOAP communication unit 801 transmits SOAP data created by a SOAP message creating unit 802 to the monitoring center host computer 111 and the delivery server 133 via the network I/F 505.

A network information acquisition unit 804 is capable of automatically acquiring IP address, DNS sever address, and gateway address in a DHCP environment. If network information input by the operation unit 510 and stored in the HDD 509 exists, the network information acquisition unit 804 acquires the information.

A device information collection unit 805 acquires counter information stored inside according to the schedule inside the apparatus or instructions from the monitoring center host computer 111. The device information collection unit 805 acquires information such as service calls, jam, shortage of toner, and the like occurring inside the apparatus. Data acquired by the device information collection unit 805 is delivered to the SOAP message creating unit 802 as it is or delivered thereto after being stored, interpreted and processed in the device information collection unit 805.

Figure 5:
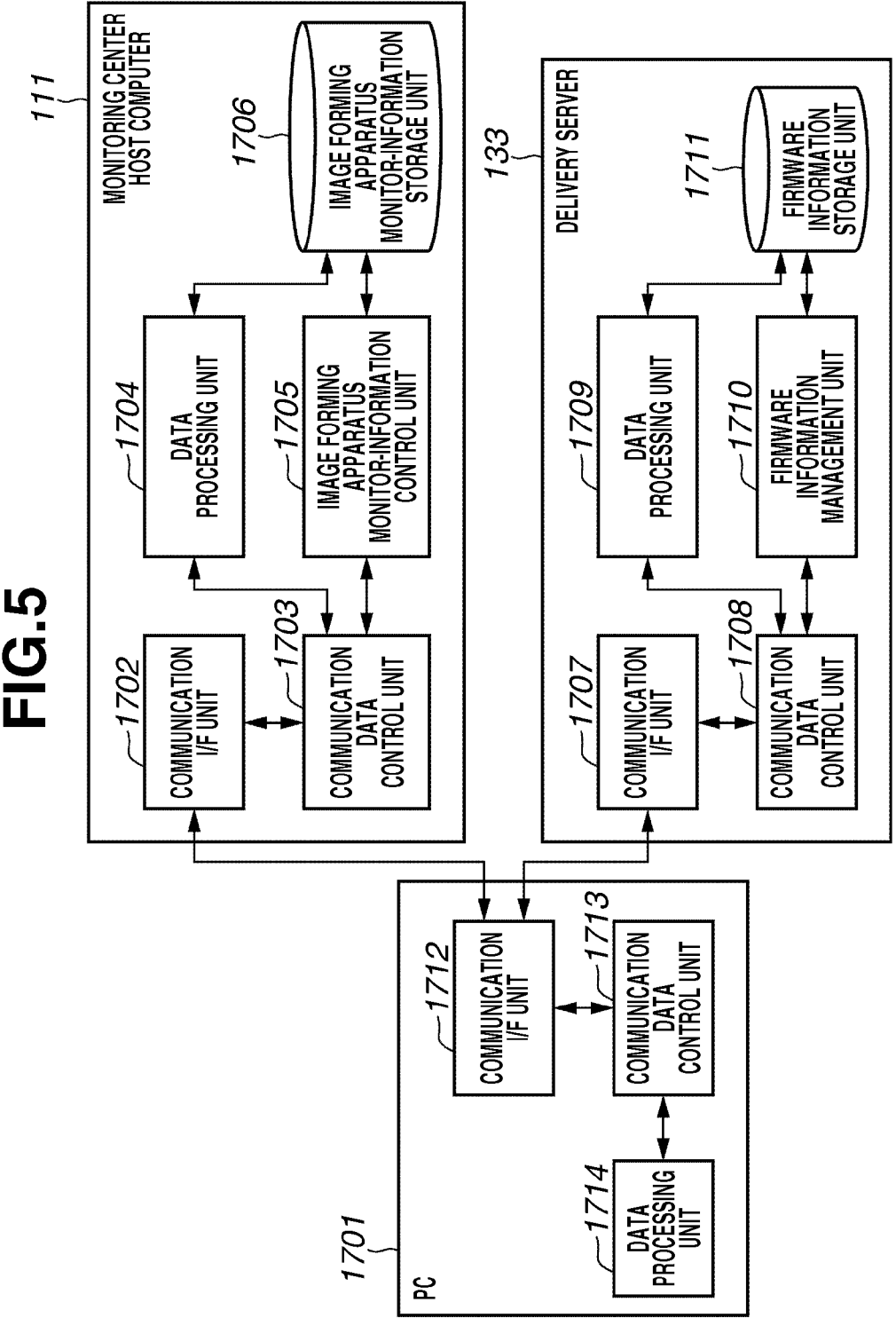
[FIG. 5]

FIG. 5 is a block diagram illustrating an example of configuration of function of the monitoring center host computer 111 and the delivery server 133.

The monitoring center host computer 111 is described below. A communication I/F unit 1702 receives a request for retrieving the image forming apparatus via HTTPS communication. A communication data control unit 1703 controls communication data received by the communication I/F unit 1702. When the image forming apparatus is retrieved, a data processing unit 1704 creates a server key and calculates hash values of the server key and associating data including retrieval results. The server key is described later.

An image forming apparatus monitor-information control unit 1705 manages information in the image forming apparatus stored in an image forming apparatus monitor-information storage unit 1706. When the request for retrieving for the image forming apparatus is received, the image forming apparatus monitor-information control unit 1705 retrieves the image forming apparatus conforming to the retrieval condition specified in the request from the image forming apparatus monitor-information storage unit 1706. The image forming apparatus monitor-information storage unit 1706 is a storage unit for storing information about the image forming apparatus monitored by the monitoring center host computer 111.

The delivery server 133 is described below. A communication I/F unit 1707 receives a request for confirming validity of retrieval results of the image forming apparatus via FITTPS communication. In the present exemplary embodiment, a response to "a request for retrieving the image forming apparatus" from "Web screen of the delivery server 133" displayed on the PC 1701 is transferred to the monitoring center host computer 111 from the PC 1701 without being displayed on "the Web screen of the delivery server 133." As described above, the response to "a request for retrieving for the image forming apparatus" includes the hash value of the server key, associating data including retrieval results, and the hash value thereof to ensure confidentiality of data. A communication data control unit 1708 controls communication data received by the communication I/F unit 1707. A data processing unit 1709 creates a server key and calculates the hash values of the server key and associating data. Thereafter, when the calculated hash value agrees with the transferred hash value, the data processing unit 1709 instructs the communication data control unit 1708 to display information identifying the retrieved image forming apparatus on the Web screen of the delivery server 133. A firmware information storage unit 1711 stores firmware information managed by the delivery server 133 therein. A firmware information management unit 1710 manages firmware information stored in the firmware information storage unit 1711.

The PC 1701 is described below. The PC 1701 being an example of an information processing apparatus corresponds to the PCs 104 and 109 illustrated in FIG. 1, for example. A communication I/F unit 1712 communicates with the monitoring center host computer 111 and the delivery server 133 via FITTPS communication. More specifically, the communication I/F unit 1712 requests the monitoring center host computer 111 to retrieve the image forming apparatus to which the firmware is delivered. The communication I/F unit 1712 transfers the response to "a request for retrieving for the image forming apparatus" from the monitoring center host computer 111 to the delivery server 133. A communication data control unit 1713 controls communication data received by the communication I/F unit 1712. The data processing unit 1714 receives user's operation, acquires information on the Web screen of the monitoring center host computer 111 from the monitoring center host computer 111 and displays the information. The data processing unit 1714 receives user's operation on the Web screen of the monitoring center host computer 111, acquires information on the Web screen of the delivery server 133 from the delivery server 133 and displays the information. The data processing unit 1714 instructs the communication data control unit 1713 to retrieve the image forming apparatus to which the firmware is delivered. When information identifying the image forming apparatus is transmitted from the delivery server 133, the data processing unit 1714 displays the information on the Web screen of the delivery server 133.

Figure 6:
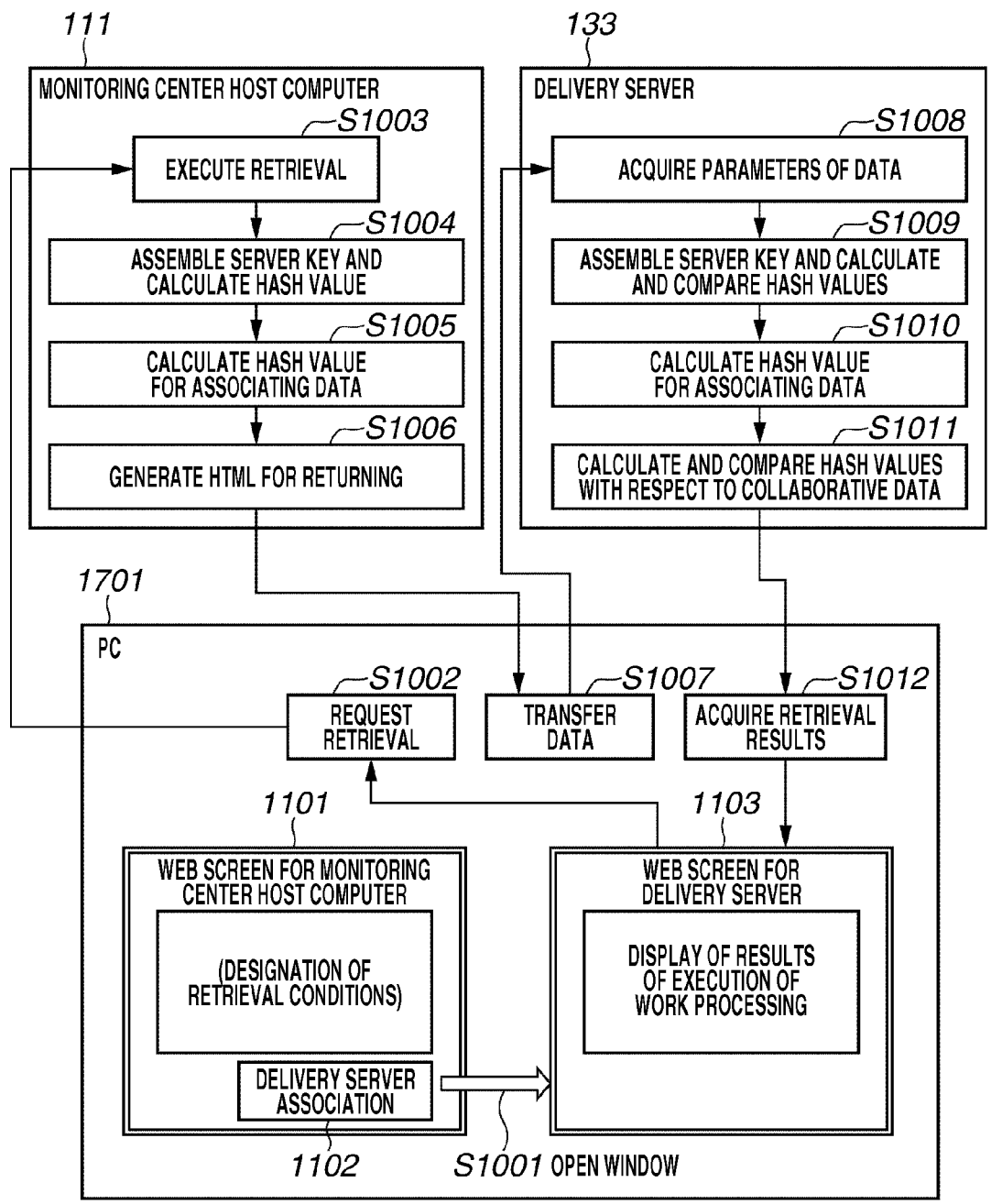
[FIG. 6]

FIG. 6 illustrates an example of processing of each apparatus in the case where the delivery server 133 associates with the monitoring center host computer 111 to respond to a request for retrieving the image forming apparatus from the PC 1701.

As described above, in the present exemplary embodiment, when information of the image forming apparatus is transmitted from the monitoring center host computer 111 to the delivery server 133 via the PC 1701, information retrieved from the database 112 of the monitoring center host computer 111 is redirected to the delivery server 133. The delivery server 133 performs a delivery processing of information identifying the retrieved image forming apparatus based on the redirected information. The processing is described in detail below with reference to a sequence diagram illustrated in FIG. 6.

In step 51001, the PC 1701 displays the Web screen 1101 of the monitoring center host computer 111 to receive retrieval conditions for the image forming apparatus to which a firmware is delivered. Depressing a delivery server association button 1102 causes the PC 1701 to call a Web screen 1103 of the delivery server 133 to display a pop-up. The subsequent processing of the PC 1701 is conducted as those related to the Web screen 1103 of the delivery server 133. In the following description, "the Web screen of the monitoring center host computer 111" is referred to as "a Web screen for the monitoring center host computer" if needed and "the Web screen of the delivery server 133" is referred to as "a Web screen for the delivery server" if needed.

As described above, in the present exemplary embodiment, the processing in step 51101, for example, is conducted to realize an example of a first display unit, a second display unit, or a providing unit.

FIG. 7A illustrates an example of the Web screen for the monitoring center host computer. FIG. 7B illustrates an example of the Web screen for the delivery server. FIG. 7B displays retrieval results of the image forming apparatus, however, nothing is displayed on the list of retrieval results at this point. FIG. 7A cites examples such as: sales organization; customer name; product name of an image forming apparatus; image forming apparatus ID that is an ID unique to each image forming apparatus; and a customer ID corresponding to a customer name, as retrieval conditions for the image forming apparatus. The retrieval conditions are not limited to the above examples, but can be set based on information which is managed by the monitoring center host computer 111 and related to other image forming apparatuses, for example.

Figure 8A:
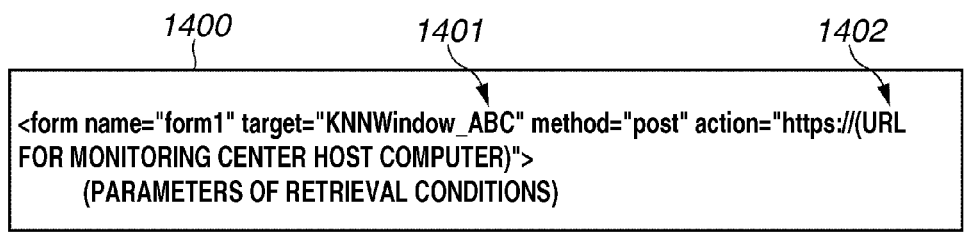
[FIG. 8A]

In step S1002, the PC 1701 requests the monitoring center host computer 111 to retrieve an image forming apparatus to which a firmware is delivered. FIG. 8A schematically illustrates an example of contents of communication data 1400 transmitted from the PC 1701 when the monitoring center host computer 111 is requested to retrieve an image forming apparatus to which a firmware is delivered. An example is cited here in which the communication data 1400 is HTML data. In FIG. 8A, a target 1401 is information (ID) which identifies the Web screen 1103 for the delivery server (target) displayed in step 51101. In the present exemplary embodiment, as described in detail with reference to FIG. 14, the target 1401 is dynamically issued to avoid inconsistency in transition of screens even if a plurality of the Web screens 1103 for the delivery server is activated. A URL 1402 for the monitoring center host computer is the one to which the retrieval is requested. Other than that, parameters for retrieval conditions are added to the communication data 1400.

Thus, in the present exemplary embodiment, the processing in step S1002, for example, is conducted to realize an example of a request unit.

In step S1003, the monitoring center host computer 111 executes a retrieval processing according to the retrieval condition specified on the Web screen 1101 for the monitoring center host computer. In the present exemplary embodiment, the number of the image forming apparatuses and the image forming apparatus ID are detected in the retrieval processing. Thus, in the present exemplary embodiment, the processing in step S1003, for example, is conducted to realize an example of a reception unit and a retrieval unit.

In step S1004, the monitoring center host computer 111 assembles a server key by a predetermined rule to use it as a hash value. FIG. 9 schematically illustrates an example of contents of the server key. The server key is data independent of associating data including retrieval results of the image forming apparatus. The use of the hash value of the server key enables improving security of data communication between the monitoring center host computer 111 and the delivery server 133. In FIG. 9, parameters illustrated in a list 1201 are connected by character strings to obtain a server key. The server key is hashed to form a hash value of the server key. Specifically, character strings of "(fixed character string A)+(the number of retrieved image forming apparatuses)+(server time stamp)" are used as a server key. The contents of the server key are not limited to the above ones, but may be separate data independent of associating data including retrieval results of the image forming apparatus. although it is preferable to use the hash value of the server key because data can be transmitted and received at a high security level, the hash value of the server key does not always need to be used.

In step S1005, the monitoring center host computer 111 creates character strings in which the retrieval results of the image forming apparatus are combined with all pieces of information required for association with the delivery server 133 as associating data and calculates a hash value for the character strings.

FIG. 10 illustrates an example of contents of associating data. In the present exemplary embodiment, the associating data 1601 includes a region 1602, a product code 1603, language 1604, the number of the image forming apparatuses 1605, and an image forming apparatus ID 1606. The region 1602 denotes the one to which the image forming apparatus managed by the monitoring center host computer 111 belongs. The product code 1603 signifies the kind of product of the image forming apparatus retrieved by the monitoring center host computer 111. The language 1604 is the one used on the Web screen 1101 for the monitoring center host computer. The number of the image forming apparatuses 1605 indicates the number of the image forming apparatuses retrieved by the monitoring center host computer 111. The image forming apparatus ID 1606 represents an ID identifying the image forming apparatuses retrieved by the monitoring center host computer 111. The number of the image forming apparatuses 1605 and the image forming apparatus ID 1606 are retrieval results of the image forming apparatus.

The monitoring center host computer 111 combines the values of all items included in the list using the character strings in order of arrangement in the list illustrated in FIG. 10. All of the numeric values are treated as numeric character strings and a delimiter is not used between the values. If the region 1602 is 4, the number of the image forming apparatuses 1605 is 100, and the image forming apparatus ID 1606 is AAAAA, for example, the associating data 1601 is indicated by "4 . . . 100AAAAA." The monitoring center host computer 111 creates the hash value of the associating data 1601 thus obtained. As described above, in the present exemplary embodiment, the processing in steps S1004 and S1005, for example, is conducted to realize an example of a generation unit.

Figure 8B:
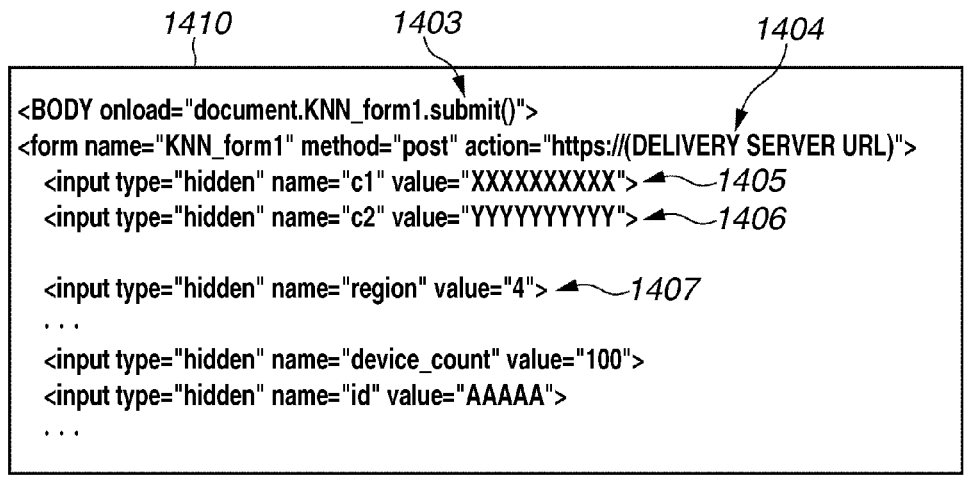
[FIG. 8B]

In step S1006, the monitoring center host computer 111 sets the hash value obtained in steps S1004 and S1005 as a hidden field in FORM along with all pieces of information (the associating data 1601 itself) transmitted to the delivery server. The monitoring center host computer 111 generates HTML data in which the delivery server 133 is designated as a destination to which FORM is transmitted (redirect destination) and sends it back to the PC 1701 (the Web screen 1103 of the delivery server). FIG. 8B schematically illustrates an example of contents of communication data 1410 sent back from the monitoring center host computer 111 in response to a request for retrieving the image forming apparatus from the PC 1701. In the example, the communication data 1410 is HTML data. HTML 1403 is the one used for sending back data from the monitoring center host computer 111 to the Web screen 1103 of the delivery server. A delivery server URL is a URL for the delivery server 133. A hash value 1405 is the one for the server key. A hash value 1406 is the one for the associating data 1601. Data 1407 is the associating data 1601 sent from the monitoring center host computer 111 to the delivery server 133. As described above, in the present exemplary embodiment, the processing in step S1006, for example, is conducted to realize an example of a response unit.

In step S1007, the PC 1701 receives the communication data from the monitoring center host computer 111. The PC 1701 transmits (transfers) the communication data received from the monitoring center host computer 111 as it is to the delivery server 133 without displaying it on the Web screen 1103. Thus, the retrieval results of the image forming apparatus are redirected. As described above, in the present exemplary embodiment, the processing in step S1007, for example, is conducted to realize an example of a transfer unit.

In step S1008, the delivery server 133 draws out the two hash values and the associating data 1601 sent from the PC 1701 (the Web screen 1103 for the delivery server). Thus, in the present exemplary embodiment, the processing in step S1008, for example, is conducted to realize an example of a reception unit. In step S1009, the delivery server 133 creates the server key, as is the case with step S1003, to obtain the hash value. The value included in the associating data 1601 obtained in step S1007 is used as the number of the retrieved image forming apparatuses. The hash values conforming to a predetermined rule are obtained as those of the server time stamp.

FIG. 11 illustrates an example of server keys assembled in step S1009 and hash values thereof. In the present exemplary embodiment, a plurality of server keys is created with a width provided for the time stamp with consideration for a time lag between the monitoring center host computer 111 and the delivery server 133. If the current time stamp of the delivery server 133 is T1, for example, the delivery server 133 performs the following processing. The delivery server 133 creates server keys of each of (m+n+1) time stamps of "T1," "T1−1 minute,"..., "T1−m (m is positive integer) minute," "T1+1 minute,"..., "T1+n (n is positive integer) minute" and calculates the hash values thereof. FIG. 11 illustrates a server key in which the number of the image forming apparatuses 1605 is 12, the current time of the delivery server 133 is 8:59, Oct. 23, 2008, m =3, and n =1.

The delivery server 133 compares the hash values (candidates of hash values) of each of a plurality of the server keys thus obtained with the hash values of the server keys obtained in step S1008. As a result of the comparison, if there is a hash value which agrees with the hash value of the server key obtained in step S1008 in the candidates of hash values, the delivery server 133 performs the processing in step S1010. If there is no hash value which agrees with the hash value of the server key obtained in step S1008, the delivery server 133 returns an error message indicating that the request is incorrect, to the PC 1701 (the Web screen 1103 of the delivery server).

In step S1010, the delivery server 133 creates character strings in which all data except the hash values in the data obtained in step S1008 are combined by the same rule as that described in step S1005. The delivery server 133 calculates hash values for the character strings. The delivery server 133 compares the calculated hash values with the hash values for the associating data 1601 obtained in step S1007. As a result of the comparison, if the hash values agree with each other, the proceeding proceeds to step S1101. If the hash values do not agree with each other, the delivery server 133 returns an error message indicating that the request is incorrect, to the PC 1701 (the Web screen 1103 of the delivery server).

Thus, in the present exemplary embodiment, the processing in steps S1009 and S1010, for example, is conducted to realize an example of a determination unit.

In step S1011, the delivery server 133 executes the processing based on information received from the monitoring center host computer 111 and returns the retrieval results of the image forming apparatus to the PC 1701 (the Web screen 1103 of the delivery server). Thereby, the processing result (the retrieval results of the image forming apparatus) in the delivery server 133 is displayed on the column of the retrieval results of the Web screen 1103 of the delivery server 133. In this stage, a list of device IDs of the retrieval results is displayed. Other columns of the retrieval results are displayed based on user's operation conducted to the Web screen 1103 of the delivery server after the list of device IDs is displayed. The delivery server 133 delivers the firmware to the image forming apparatus retrieved by the monitoring center host computer 111 according to the contents input into the retrieval results of the Web screen 1103 of the delivery server.

Thus, in the present exemplary embodiment, the processing in step S1011, for example, is conducted to realize an example of a transmission unit.

Figure 12:
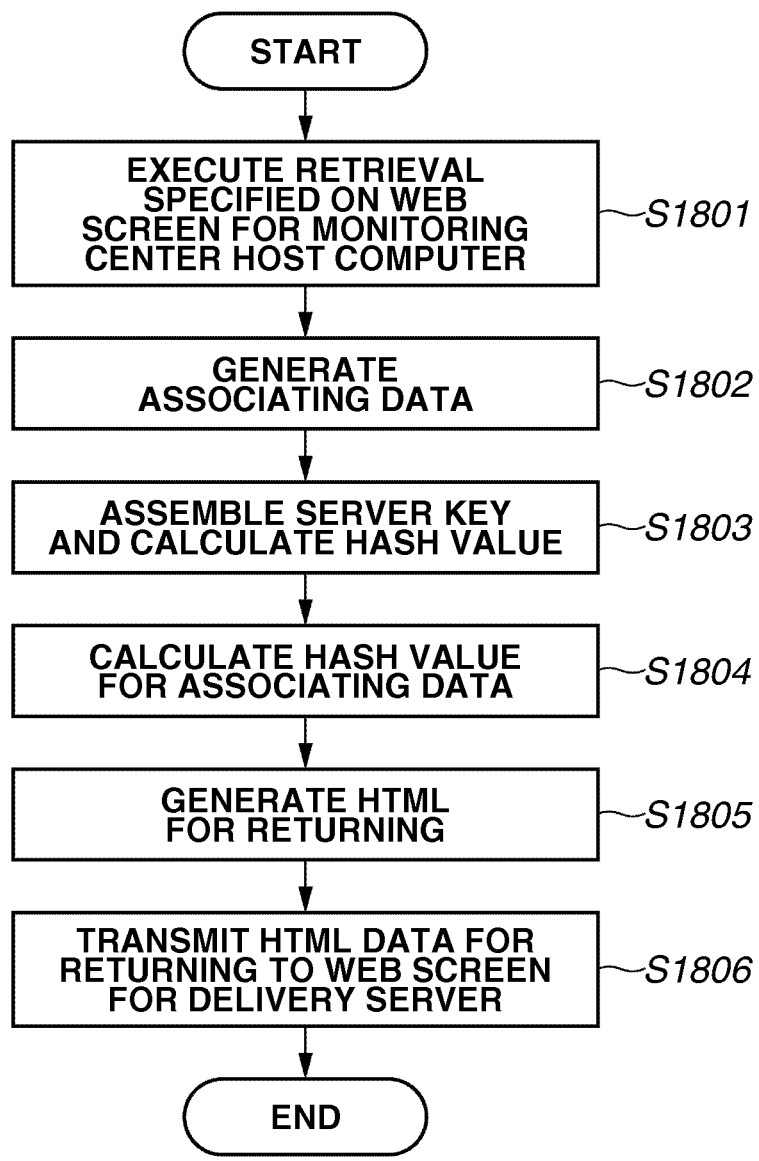
[FIG. 12]

An example of processing of the monitoring center host computer 111 is described below with reference to a flow chart of FIG. 12.

In step S1801, the communication I/F unit 1702 receives a request (the communication data 1400) for retrieving the image forming apparatus from the PC 1701, which is made in processing related to the Web screen 1103 of the delivery server . The image forming apparatus monitor-information control unit 1705 executes retrieval of the image forming apparatus according to the retrieval conditions specified on the Web screen 1101 for the monitoring center host computer. The number of the image forming apparatuses 1605 and the image forming apparatus ID 1606 are retrieved.

In step S1802, the data processing unit 1704 generates the associating data 1601 transmitted to the delivery server 133. As illustrated in FIG. 10, the associating data 1601 includes the region 1602, the product code 1603, and the language 1604, in addition to the number of the image forming apparatuses 1605 and the image forming apparatus ID 1606.

In step S1803, the data processing unit 1704 assembles the server key and makes the hash value out of the server key. In step S1804, the data processing unit 1704 generates the hash value from the associating data 1601. In step S1805, the data processing unit 1704 creates HTML data for return (communication data 1410) including the associating data 1601 generated in step S1802 and the hash values generated in steps S1803 and S1804. In step S1806, the communication I/F unit 1702 transmits the return HTML data (communication data 1410) created in step S1805 to the PC1701 (the Web screen 1103 of the delivery server). The processing in the flow chart illustrated in FIG. 12 is ended.

Figure 13:
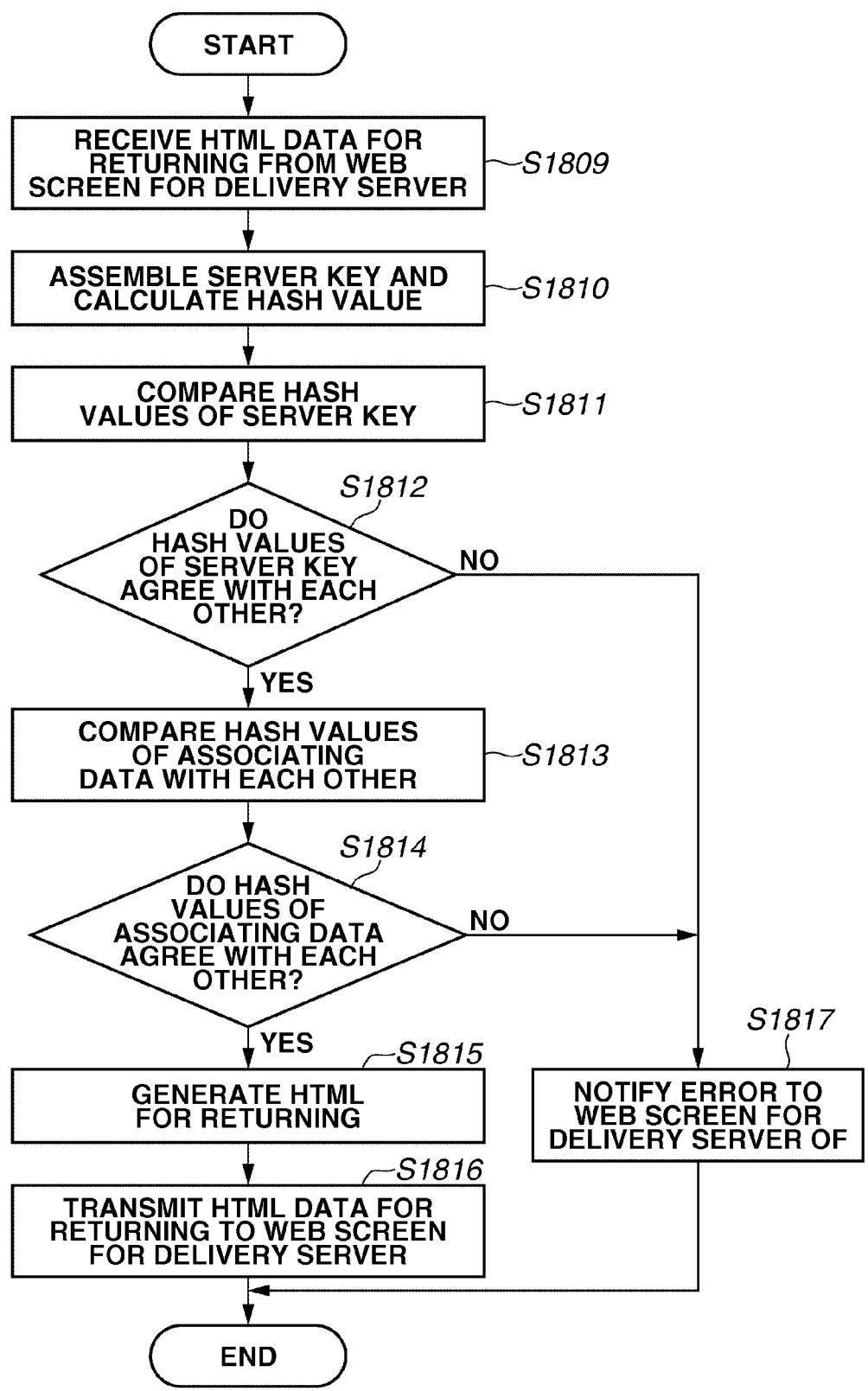
[FIG. 13]

An example of processing of the delivery server 133 is described below with reference to a flowchart of FIG. 13. Instep S1809, the communication I/F unit 1707 receives the return HTML data (communication data 1410) transferred and redirected from the PC 1701 as the processing related to the communication I/F unit 1707. As described above, the return HTML data (communication data 1410) includes the associating data 1601, the hash value of the associating data 1601, and the hash value of the server key.

In step S1810, the data processing unit 1709 assembles the server key and makes the hash value out of the server key. As described above, a plurality of hash values is calculated with consideration for a time lag between the delivery server 133 and the monitoring center host computer 111. In step S1811, the data processing unit 1709 compares the hash value of the server key obtained in step S1810 with a plurality of the hash values obtained in step S1811.

In step S1812, as a result of the comparison in step S1811, the data processing unit 1709 determines whether there is a hash value which agrees with the hash value of the server key obtained in step S1809 in a plurality of the hash values obtained in step S1811. As a result of the determination, if there is no hash value which agrees with the hash value of the server key obtained in step S1809 in a plurality of the hash values obtained in step S1811 (NO in step S1812) , the processing proceeds to step S1817.

In step S1817, the data processing unit 1709 creates an error message indicating that the request is incorrect and the communication I/F unit 1707 transmits the error message to the PC 1701 (the Web screen 1103 of the delivery server) . The processing in the flow chart illustrated in FIG. 13 is ended.

If there is a hash value which agrees with the hash value of the server key obtained in step S1809 (YES in step S1812) , the processing proceeds to step S1813. In step S1813, the data processing unit 1709 calculates the hash value of the associating data 1601 obtained in step S1809 and compares the calculated hash value with the hash value of the associating data 1601 obtained in step S1809. In step S1814, as a result of the comparison in step S1813, the data processing unit 1709 determines whether the hash value of the associating data 1601 obtained in step S1809 agrees with the hash value of the associating data 1601 obtained in step S1809. As a result of the determination, if the hash value of the associating data 1601 obtained in step S1809 does not agree with the hash value of the associating data 1601 obtained in step S1809 (NO in step S1814), the processing proceeds to step S1817 described above and the error message is transmitted. The processing in the flow chart illustrated in FIG. 13 is ended.

If the hash value of the associating data 1601 obtained in step S1809 agrees with the hash value of the associating data 1601 obtained in step S1809 (YES in step S1814), the processing proceeds to step S1815. In step S1815, the data processing unit 1709 creates the return HTML data to be returned to the Web screen 1103 of the delivery server. The return HTML data includes the number of the image forming apparatuses 1605 and the image forming apparatus ID 1606 which are included in the associating data 1601 obtained in step S1809. In step S1816, the communication I/F unit 1707 transmits the return HTML data created in step S1815 to the PC 1701 (the Web screen 1103 of the delivery server). The processing in the flow chart illustrated in FIG. 13 is ended.

Figure 14C:
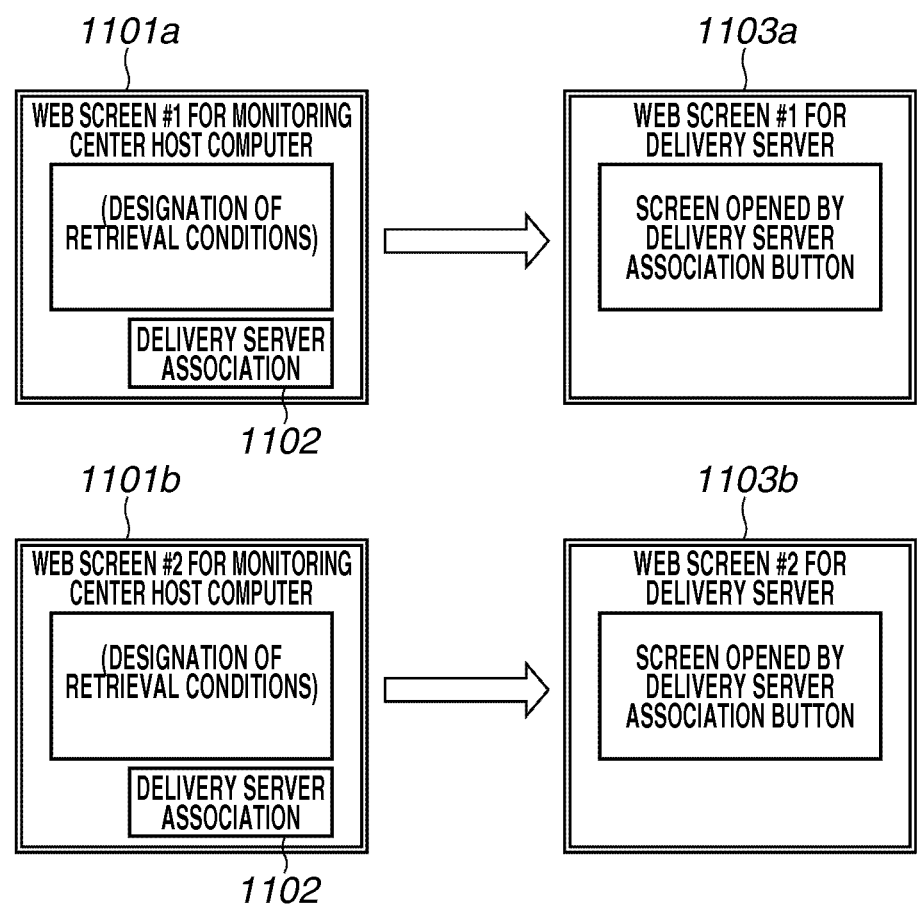
[FIG. 14C]

FIGS. 14A, 14B, and 14C illustrate a first to a third example indicating that the Web screen 1101 for the monitoring center host computer and the Web screen 1103 for the delivery server shift.

In the present exemplary embodiment, when the FORM. is specified at the time of executing retrieval in the monitoring center host computer 111, the target of the Web screen 1103 for the delivery server is dynamically specified by the target 1401 in the communication data 1400 to avoid inconsistency in transition of screens. For example, every time the delivery server association button 1102 on the Web screen 1101 for the monitoring center host computer is depressed to issue instructions for opening the Web screen 1103 for the delivery server, the target 1401 is dynamically created. For example, if the delivery server association button 1102 is first depressed, the target 1401 is given by target="server AAAAAA," for example, to set a target window. If the delivery server association button 1102 is secondly depressed, the target 1401 is given by target="server BBBBBB," for example, to associate the Web screen 1101 for the monitoring center host computer with the Web screen 1103 for the delivery server. If the delivery server association button 1102 is thirdly depressed, the target 1401 is given by target="server CCCCCC," for example.

The above AAAAAA, BBBBBB, and CCCCCC may be predetermined hash values. The two associating Web screens (the Web screen 1101 for the monitoring center host computer and the Web screen 1103 for the delivery server) are associated with each other by the target 1401 to allow avoiding inconsistency in transition of screens even if a large number of the Web screens are displayed.

As illustrated in FIG. 14A, suppose that the delivery server association button 1102 of the Web screen 1101 for the monitoring center host computer is depressed to open the Web screen 1103 for the delivery server. Even if a Web screen 1901 for the delivery server different from the Web screen 1103 for the delivery server exists, the Web screen 1103 for the delivery server operates independent of the Web screen 1901 for the delivery server. As illustrated in FIG. 14B, suppose that the delivery server association button 1102 of the Web screen 1101 for the monitoring center host computer is depressed to open the Web screen 1103 for the delivery server. Then, if search processing of the image forming apparatus is again performed by operating the Web screen 1101 for the monitoring center host computer, the Web screen 1103 for the delivery server which has already opened can be reused.

As illustrated in FIG. 14C, suppose that the delivery server association button 1102a of the Web screen 1101a for the monitoring center host computer is depressed to open the Web screen 1103a for the delivery server. Similarly, it is assumed that the delivery server association button 1102b of the Web screen 1101b for the monitoring center host computer is depressed to open the Web screen 1103b for the delivery server and the four Web screens 1101a, 1101b, 1103a, and 1103b are displayed on one display screen at the same time. Thus, if a plurality of the Web screens 1101 for the monitoring center host computer is opened, the Web screens 1103 for the delivery server are opened from their respective screens (associated with the their respective screens).

In the present exemplary embodiment, the delivery server association button 1102 provided by the Web screen 1101 for the monitoring center host computer is depressed to start the Web browser, opening the Web screen 1103 for the delivery server provided by the delivery server 133. A retrieval request including a request from the Web screen 1103 for the delivery server and retrieval conditions is transmitted to the monitoring center host computer 111. The monitoring center host computer 111 retrieves the image forming apparatus according to the retrieval conditions and transmits the retrieved results along with information for detecting interpolation thereof, to the delivery server 133 from the monitoring center host computer 111 via the PC 1701 with the delivery server 133 as a redirection destination. Accordingly, data can be transmitted and received at a high security level while reducing user's burden, between a device management system for monitoring the image forming apparatus and a data delivery system for delivering document to the image forming apparatus.

The monitoring center host computer 111 is associated with the delivery server 133 to allow the reduction of serviceman dispatch at the time of updating the firmware of the image forming apparatus. Since the Web screen 1103 for the delivery server that makes a request is dynamically specified and retrieval is requested, a correspondence relationship between the Web screen 1101 for the monitoring center host computer and the Web screen 1103 for the delivery server can be maintained. Inconsistency in operation can be avoided even if a large number of the Web screens are displayed.

In the present exemplary embodiment, the example is described in which the image forming apparatus to which the firmware is delivered is retrieved and a user of the PC 1701 is notified of the retrieval results. However, this does not always need to be done as mentioned above. If an image forming apparatus existing at a location needs to be identified, for example, information related to the location of the image forming apparatus (for example, information about a business office X of a company A) maybe used as results retrieved by the monitoring center host computer 111. Data except the firmware may be delivered.

Other Embodiments

The present invention is realized also in such a manner that a software (program) realizing the functions of the aforementioned exemplary embodiment is supplied to a system or an apparatus via a network or various storage media and a computer of the system or the apparatus reads and executes the program.

The foregoing exemplary embodiments are merely illustrative of a specific example for executing the present invention and are not to be construed to limit the technical scope of the present invention. The present invention can be executed in various forms without departing from its technical sprit of or its primary characteristics.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-163105 filed Jul. 9, 2009, which is hereby incorporated by reference herein in its entirety.

The invention claimed is:

1. A network system in which a device management system configured to communicate with a plurality of devices to manage collected device information indicating the setting and configuration of the devices, a data delivery system configured to deliver data to the devices and an information processing apparatus are connected with each other,
wherein:
the information processing apparatus including a display device comprises:
a first display unit configured to display a first screen provided by the device management system on the display device;
a second display unit configured to display a second screen provided by the data delivery system on the display device when a user performs a predetermined operation on the first screen provided by the device management system; and
a request unit configured to request the device management system to retrieve identification information of a device to which data is to be delivered via the second screen provided by the data delivery system;
the device management system comprises:
a retrieval unit configured to retrieve, from a database for managing information of devices to be monitored by the device management system, identification information of a device to which data is to be delivered, based on the request from the request unit; and
a responding unit configured to transmit information related to the results of retrieval by the retrieval unit to the information processing apparatus as the response to the request from the request unit, wherein the data delivery system is designated as a redirection destination on the transmission of the information related to the results of the retrieval; and
the data delivery system comprises:
a receiving unit configured to receive the information related to the results of retrieval from the information processing apparatus according to a transfer process operated on the information processing apparatus using the redirection destination.

2. A device management apparatus which is connected with a data delivery system configured to deliver data to devices and an information processing apparatus via a network and manages device information indicating the setting and configuration of a plurality of devices, the device management apparatus comprising:
a receiving unit configured to receive a request for retrieval about identification information of a device to which data is delivered as the request via a predetermined screen which is displayed on the display device of the information processing apparatus and provided by the data delivery system;
a retrieval unit configured to retrieve, from a database for managing information of devices to be monitored by the device management apparatus, identification information of a device based on the received request; and
a responding unit configured to transmit information related to the results of the retrieval by the retrieval unit to the information processing apparatus as the response to the received request,
wherein the data delivery system is designated as a redirection destination on the transmission of the information related to the results of the retrieval.

3. The device management apparatus according to claim 2, further comprising a generation unit configured to generate information for detecting, in the data delivery system, interpolation to the information related to the results of retrieval of the device,
wherein the responding unit is configured to transmit, to the information processing apparatus as the response to the request, the information related to the results of the retrieval by the retrieval unit and the generated information for detecting the interpolation.

4. The device management apparatus according to claim 2, wherein the information related to the results of retrieval by the retrieval unit includes the number of the devices and identification information of the each device according to the retrieval based on the received request for the retrieval.

5. A data delivery apparatus which is connected with a device management system configured to communicate with a plurality of devices to manage collected device information indicating the setting and configuration of the devices and an information processing apparatus via a network, the data delivery apparatus comprising:
a provision unit configured to provide a second screen for the information processing apparatus according to a predetermined operation performed on a first screen which the device management system provides to the information processing apparatus, wherein a request for retrieval about identification information of a device to which data is delivered is performed via the provided second screen in the information processing apparatus; and
a receiving unit configured to receive information related to results of the retrieval from the information processing apparatus according to a transfer process operated on the information processing apparatus upon receiving the information related to the results of retrieval from the device management system with the data delivery system being designated as a redirection destination,
wherein the information related to the results of retrieval includes identification information of each device is retrieved based on the request from a database for managing information of devices to be monitored by the device management system.

6. The data delivery apparatus according to claim 5, wherein the provision unit transmits the information related to the results of retrieval received by the receiving unit to the information processing apparatus in order to further provide the second screen including information related to the device to which data is delivered.

7. The data delivery apparatus according to claim 5, wherein the information related to the results of retrieval further includes the number of the devices retrieved based on the request.

8. A method in a network system in which a device management system configured to communicate with a plurality of devices to manage collected device information indicating the setting and configuration of the devices, a data delivery system configured to deliver data to the devices and an information processing apparatus are connected with each other, the method comprising:

first providing of information for displaying a first screen on the display device by the device management system;

second providing of information for displaying a second screen on the display device when a user performs a predetermined operation on the first screen by the data delivery system;

retrieving, from a database for managing information of devices to be monitored by the device management system, identification information of a device to which data is to be delivered, based on the request for retrieving the device to which data received from the information processing apparatus is delivered according to instructions via the second screen by the device management system;

transmitting information related to the results of retrieval as the response to the received request to the information processing apparatus by the device management system, wherein the data delivery system is designated as a redirection destination on the transmission of the information related to the results of the retrieval; and receiving, in the data delivery system, the information related to the results of retrieval from the information processing apparatus according to a transfer process operated on the information processing apparatus using the redirection destination.

9. A method for a device management apparatus which is connected with a data delivery system configured to deliver data to devices and an information processing apparatus via a network and manages device information indicating the setting and configuration of a plurality of devices, the method comprising:

receiving a request for retrieval about identification information of a device to which data is delivered as the request via a predetermined screen which is displayed on the display device of the information processing apparatus and provided by the data delivery system;

retrieving, from a database for managing information of devices to be monitored by the device management apparatus, identification information of a device based on the received request; and transmitting information related to the results of the retrieval as the response to the received request to the information processing apparatus, wherein the data delivery system is designated as a redirection destination on the transmission of the information related to the results of the retrieval.

10. A method for a data delivery apparatus which is connected with a device management system configured to communicate with a plurality of devices to manage a collected device information indicating the setting and configuration of the devices and an information processing apparatus via a network, the method comprising:

providing a second screen for the information processing apparatus according to a predetermined operation performed on a first screen which the device management system provides to the information processing apparatus, wherein a request for retrieval about identification information of a device to which data is delivered is performed via the provided second screen in the information processing apparatus; and receiving information related to results of the retrieval from the information processing apparatus according to a transfer process operated on the information processing apparatus upon receiving the information related to the results of retrieval from the device management system with the data delivery system being designated as a redirection destination, wherein the information related to the results of retrieval includes identification information of each device is retrieved based on the request from a database for managing information of devices to be monitored by the device management system.

11. A non-transitory computer readable storage medium on which is stored a computer program for making a computer execute a method for a device management apparatus which is connected with a data delivery system configured to deliver data to devices and an information processing apparatus via a network and manages device information indicating a setting and configuration of a plurality of devices, the method comprising the steps of:

receiving a request for retrieval about identification information of a device to which data is delivered as the request via a predetermined screen which is displayed on a display device of the information processing apparatus and provided by the data delivery system;

retrieving, from a database for managing information of devices to be monitored by the device management apparatus, identification information of the device based on the received request; and transmitting information related to results of the retrieval as a response to the received request to the information processing apparatus, wherein the data delivery system is designated as a redirection destination on the transmission of the information related to the results of the retrieval.

12. A non-transitory computer readable storage medium on which is stored a computer program for making a computer execute a method for a data delivery apparatus which is connected with a device management system configured to communicate with a plurality of devices to manage a collected device information indicating the setting and configuration of the devices and an information processing apparatus via a network, the method comprising the steps of:

providing a second screen for the information processing apparatus according to a predetermined operation performed on a first screen which the device management system provides to the information processing apparatus, wherein a request for retrieval about identification information of a device to which data is delivered is performed via the provided second screen in the information processing apparatus; and receiving information related to results of the retrieval from the information processing apparatus according to a transfer process operated on the information processing apparatus upon receiving the information related to the results of retrieval from the device management system with the data delivery system being designated as a redirection destination, wherein the information related to the results of retrieval includes identification information of each device is retrieved based on a request from a database for managing information of devices to be monitored by the device management system.

* * * * *